(12) United States Patent
Cheung et al.

(10) Patent No.: US 8,661,943 B2
(45) Date of Patent: Mar. 4, 2014

(54) FOUR-SPEED DRIVE SYSTEM FOR MOTOR-DRIVEN APPLIANCES

(75) Inventors: Shu Wan Cheung, Quarry Bay (HK); Shu Sang Cheung, Quarry Bay (HK); To Yin Pang, Quarry Bay (HK)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 509 days.

(21) Appl. No.: 13/083,459

(22) Filed: Apr. 8, 2011

(65) Prior Publication Data

US 2012/0167712 A1 Jul. 5, 2012

(30) Foreign Application Priority Data

Dec. 31, 2010 (CN) ..................... 2010 2 0693181 U

(51) Int. Cl.
 *A47J 43/08* (2006.01)
(52) U.S. Cl.
 USPC ........... 74/810.1; 74/665 F; 74/665 S; 74/356
(58) Field of Classification Search
 USPC ................ 74/810.1, 650, 664, 665 F, 665 G, 74/665 GA, 665 GC, 665 GD, 665 S, 665 P, 74/322–325, 331, 333, 356, 425; 475/6–8, 475/295–297, 332; 192/48.92; 310/78, 83
 See application file for complete search history.

(56) References Cited

U.S. PATENT DOCUMENTS

| | | | | |
|---|---|---|---|---|
| 5,333,517 | A * | 8/1994 | Bryson et al. | 74/810.1 |
| 8,382,627 | B2 * | 2/2013 | Cheung et al. | 475/150 |
| 8,506,437 | B2 * | 8/2013 | Cheung et al. | 475/12 |
| 2011/0190085 | A1 * | 8/2011 | Yang | 475/12 |
| 2012/0071293 | A1 * | 3/2012 | Cheung et al. | 475/331 |
| 2012/0129643 | A1 * | 5/2012 | Cheung et al. | 475/149 |
| 2012/0167712 | A1 * | 7/2012 | Cheung et al. | 74/650 |

* cited by examiner

*Primary Examiner* — Troy Chambers
*Assistant Examiner* — Valentin Craciun
(74) *Attorney, Agent, or Firm* — Intellectual Property Law Group LLP

(57) ABSTRACT

A mechanical four-speed gearbox/drive system for household appliances comprising two drive-outlets; each drive-outlet driven at two different speeds in the same rotational direction; a motor, motor shaft, first drive-outlet and second drive-outlet, with installation of one-way bearings in suitable places in the gear-train. The motor drives two drive-outlets and rotates in clockwise and counter-clockwise directions through three one-way bearings and two gear down systems to provide four different speed drives. When operating in hi-speed mode, the first drive-outlet is directly driven by the motor. When operating in lo-speed mode, the first drive-outlet is driven via the gear down system, with resulting increase in torque. Simultaneously, second drive-outlet is driven via second gear down system to provide two different speed drives. This gearbox is simple to construct and operable without expensive control electronics. In applications with electronic motor speed and directional control, much broader and practical drive-outlet speed ranges are achieved.

20 Claims, 6 Drawing Sheets

FOUR-SPEED DRIVE SYSTEM FOR MOTOR-DRIVEN APPLIANCES

CROSS-REFERENCE TO RELATED APPLICATION

This application claims benefit of China patent application no. 201020693181.8, filed on Dec. 31, 2010, the disclosure of which is hereby incorporated by reference in its entirety for all purposes.

BACKGROUND OF THE INVENTION

1. Field of Invention

The present invention relates to a drive system for motor-driven appliances. In particular, the invention relates to a mechanical four-speed drive system or gearbox for household appliances in which the system has two drive-outlets.

2. Background

In traditional household appliances, such as juice extractor, blenders, meal makers, stir cookers, food processors, soymilk makers and soup makers, and so forth, a common construction among such appliances is where a motor is fixed in a unit base, the motor shaft is mounted with a coupling, the blade or tools are directly assembled to the drive outlet, and the motor rotates at a speed that directly drives the blade or tools to process the foods. Since different foods need different processing speeds, traditional household appliances have a speed adjustment switch, but its speed is changed by variable voltage. Although it saves energy, it is very low in reliability, output torque is decreased, speed is unstable, and it can only process soft foods. The harder foods are very difficult to process, aggravating and damaging the motor as well as the blade or tools of the appliance.

In addition, household appliances on the market are set with two or three drive outlets that provide two or three different speeds, and can be connected to different sized blade or tools. Each drive outlet has its different speed to process food. In order to process the different kinds of foods, additional blades or tools need to be changed and connected with the particular drive outlets. During the process of changing the blades or tools, the unit needs to be stopped, excessive blades or tools need to be changed and connected with the drive outlets, which cause inconvenience and waste of time. Also, when processing hot food, changing the blades or tools is both difficult and unsafe.

Therefore, there is a need for a household appliance with a four-speed drive system that provides two drive-outlets, in which each drive-outlet can be driven at two different speeds in the same rotational direction. There is a need for such an invention in which a four-speed drive system is cooperated with a motor, three one-way bearings, and a gear system without changing the input voltage, and which is of simple construction, reliable, stable with high torque, convenient to use, and able to process various foods.

SUMMARY OF THE INVENTION

It is therefore an object of the present invention to provide a household appliance with a four-speed drive system which has two drive-outlets, and in which each drive-outlet can be driven at two different speeds in the same rotational direction.

It is another object of the invention to provide a motor which drives two drive-outlets and rotates in the clockwise and counter-clockwise directions through three one-way bearings and two gear down systems, to provide four different speed drives.

It is another object of the invention to provide this four-speed drive system incorporating a motor, three one-way bearings, two gear down systems, without changing the input voltage.

It is another object of the invention to provide a first drive-outlet which has two different speed drives; the first speed which cooperates with a motor, motor shaft, one-way bearings and drive-shaft, and drives at high speed. The second speed is cooperated with a motor, motor shaft, one-way bearings, drive-shaft and a first gear down system, and drives at low speed according to gear ratio.

It is a further object of the invention to provide a second drive-outlet which has two different speed drives; the first speed which cooperates with a motor, motor shaft, one-way bearings, drive-shaft and a second gear down system, and drives at a different speed according to gear ratio. The second speed cooperates with a motor, motor shaft, one-way bearings, drive-shaft and a first and second gear down system, and driven at a different speed according to gear ratio.

Accordingly, there is provided a four-speed drive system comprising three one-way bearings, in which the installation of one-way bearings is in suitable places in the gear-train. One-way bearings known as directional couplings, means that the driving member rotates the driven member in one direction, while automatically disengaging itself from the driven member when the direction of rotation is reversed.

In applications where the drive outlets are required to rotate in clockwise/counter-clockwise direction in the high/low speed mode, additional gearing can be inserted in the gearbox to achieve this requirement.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

Figure 1:
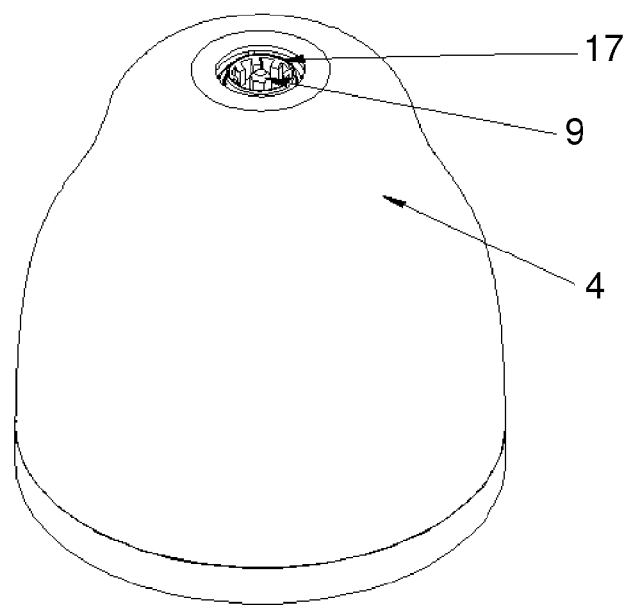
FIG. 1 is a perspective view of a base of a four-speed drive system for an appliance, according to an embodiment of the present invention.
Figure 2:
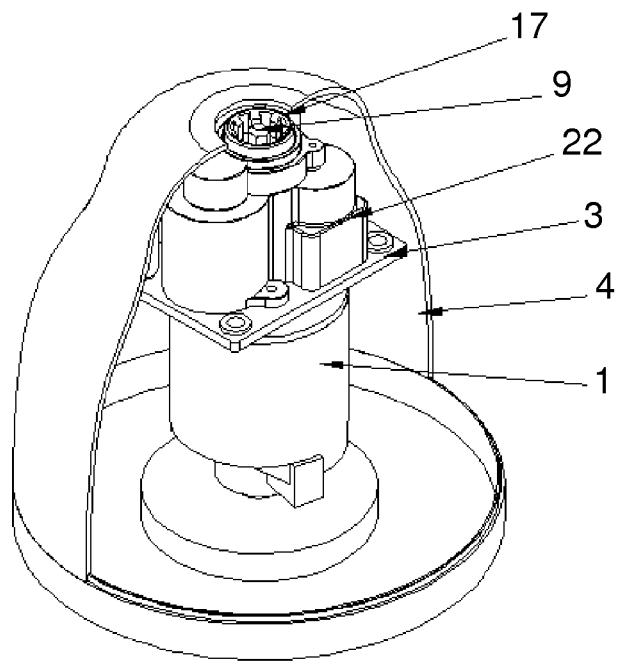
FIG. 2 is a perspective view of the internal four-speed drive system assembly of FIG. 1 with the cross-section through its base housing, according to an embodiment of the present invention.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Referring to FIG. 1, FIG. 2, FIG. 3, and FIG. 4, the four-speed drive system for household appliances according to an embodiment of the present invention comprises a motor 1 and motor shaft 2 which are installed in a support bracket 3. The support bracket 3 is installed in a base 4 of a house appliance, and within the middle of the motor shaft 2 there is installed a first one-way bearing 5. At the end of motor shaft 2 there is installed a second one-way bearing 6. A drive-shaft 7 is mounted in the second one-way bearing 6, and within the middle of the drive-shaft 7 there is installed a third one-way bearing 8. A drive gear 15 is installed on the third one-way bearing 8.

Figure 3:
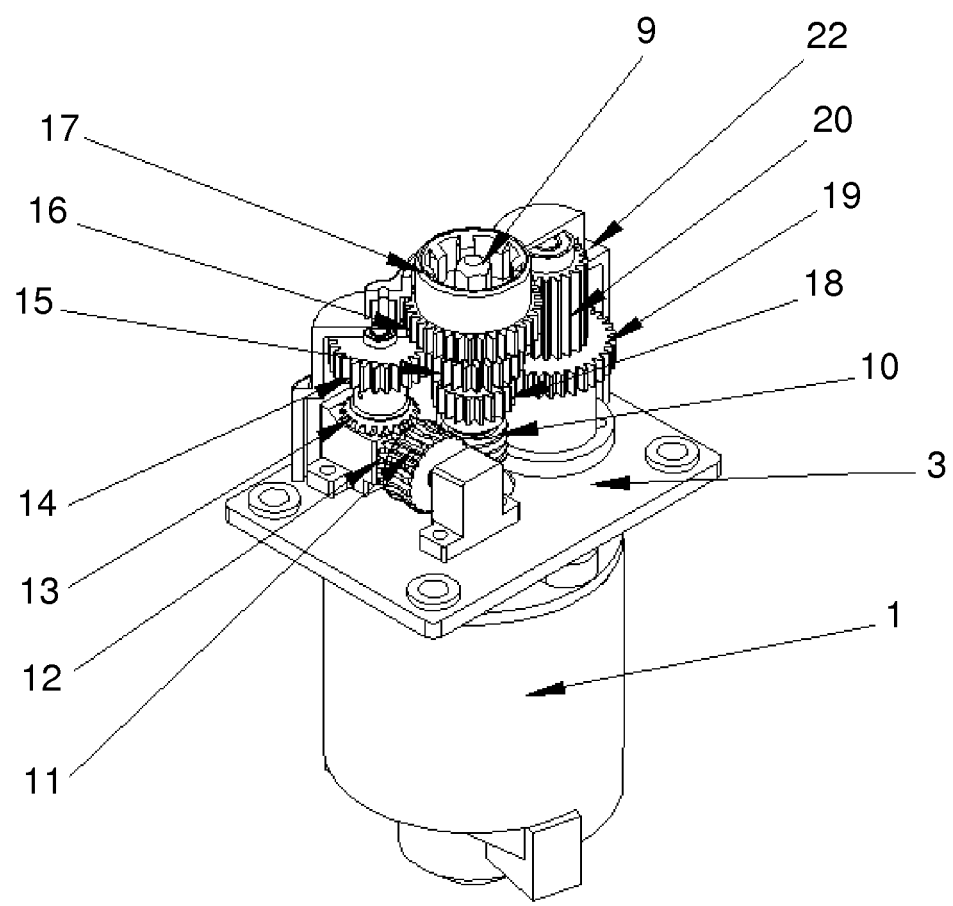
FIG. 3 is a perspective view of a four-speed drive system with a worm gear down system, according to an embodiment of the present invention.
Figure 4:
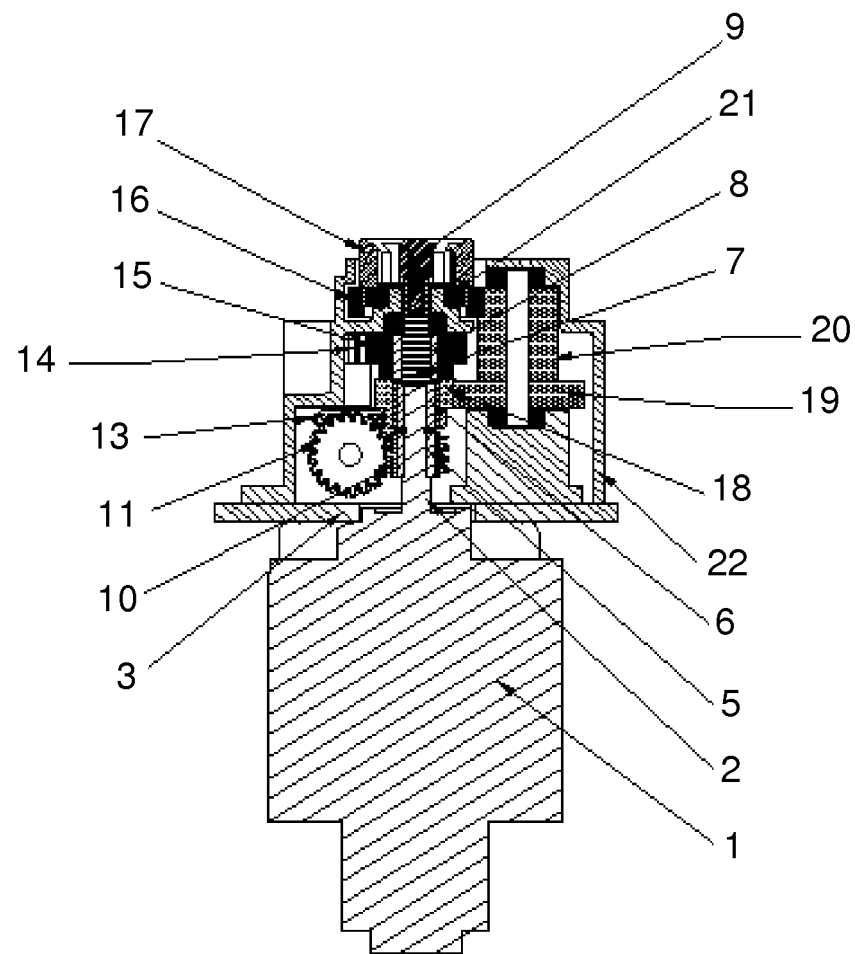
FIG. 4 is a cross sectional view of the four-speed drive system with a worm gear down system of FIG. 3, according to an embodiment of the present invention.

As further illustrated in FIG. 3 and FIG. 4, a first drive-outlet 9 is mounted on the end of the drive-shaft land the first one-way bearing 5 is installed with a worm 10 which drives a first gear down system. The first gear down system comprises the worm 10 which is connected/meshed with and drives a worm gear 11; another side of the worm gear 11 is set with a first bevel gear 12 which connects with and drives a second bevel gear 13; the top of the second bevel gear 13 is set with a gear 14 (a top gear) which connects with and drives the drive gear 15; the drive gear 15, which is installed on the third one-way bearing 8, drives both the drive-shaft 7 and the first drive-outlet 9.

As shown in the embodiment of the present invention, the system further comprises a second drive-outlet 17, which is mounted on the top of a gear 16; a gear 18 is installed to a lower end of the drive-shaft 7 and drives a second gear down system. The second gear down system comprises the gear 18 which is connected with and drives a gear 19, the top of the gear 19 is set with another gear 20 that is connected to and drives the gear 16 and the second drive outlet 17. The gear 16 is assembled to a bearing 21 which is mounted in the gear box shell 22.

Figure 5A:
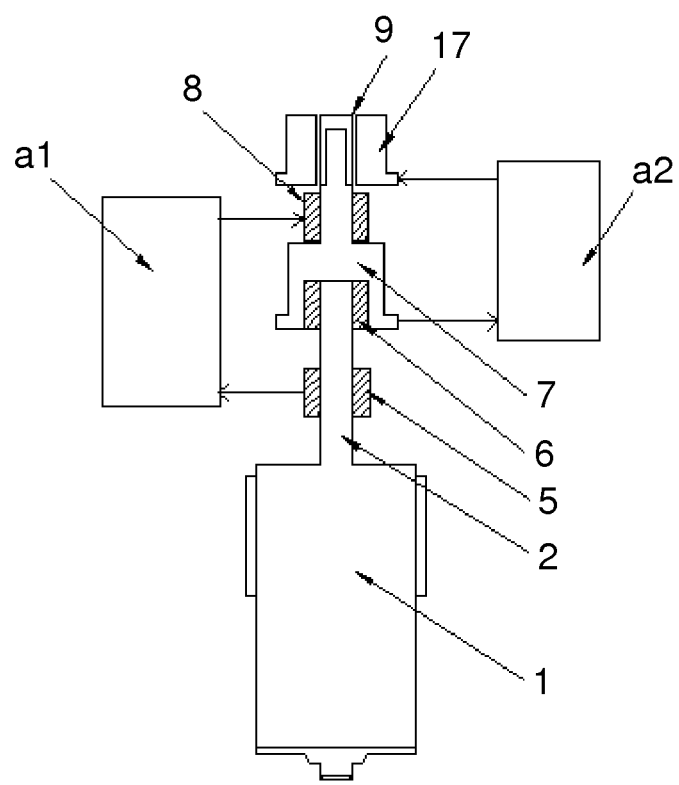
FIG. 5a, FIG. 5b, FIG. 5c illustrate the principle of a four-speed drive system, according to an embodiment of the present invention.
Figure 5B:
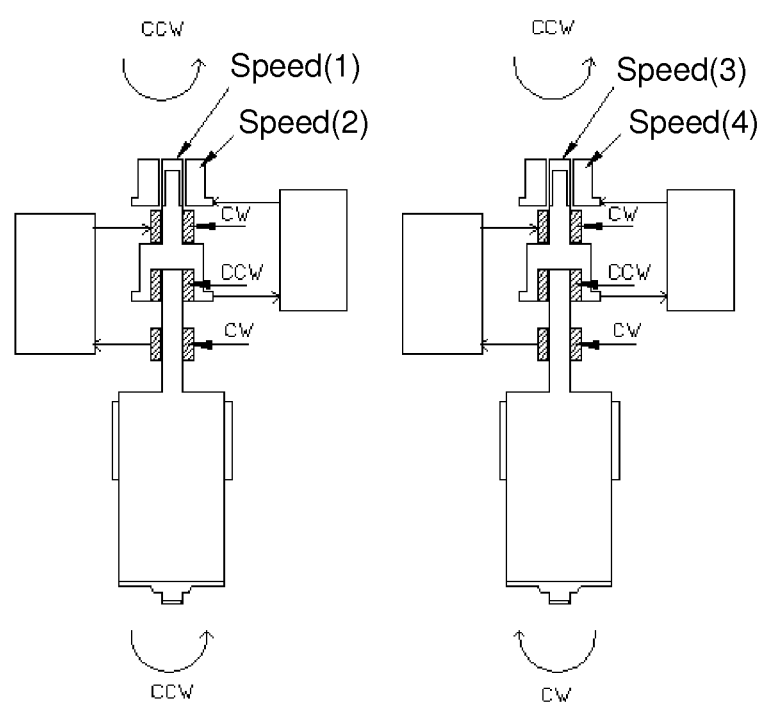
Figure 5C:
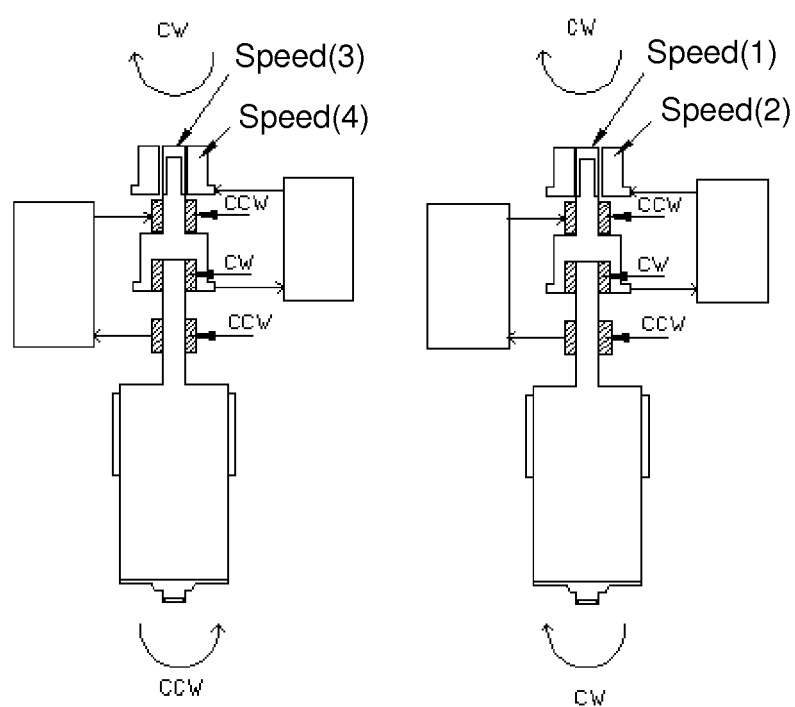

Referring to FIG. 5a, FIG. 5b, FIG. 5c, there is illustrated the principle of the first drive-outlet 9 and the second drive-outlet 17 of the system being driven at four different speeds in the same rotational direction; where the first one-way bearing 5 and the third one-way bearing 8 are set in one drive direction, the second one-way bearing 6 is set in an opposite drive direction. The first one-way bearing 5 and the third one-way bearing 8 are connected with the first gear down system a1. The drive-shaft 7 is driven via the second gear down system a2 to the second drive-outlet 17.

The motor 1 drives two drive-outlets and rotates in clockwise and counter-clockwise directions through three one-way bearings and two gear down systems to provide four different speed drives. When operating in the high speed mode, the first drive-outlet 9 is directly driven by the motor 1. When operating in a low speed mode, the first drive-outlet 9 is driven via the gear down system a1, with resulting increase in torque. Simultaneously, second drive-outlet 17 is driven via second gear down system a2 to provide two different speed drives.

In FIG. 5b, the first one-way bearing 5 and the third one-way bearing 8 are set in clockwise drive direction (CW) in view from the top, (herein CW meaning that the driving member rotates and engages with the driven member in clockwise drive direction); the second one-way bearing 6 is set in counter-clockwise drive direction (CCW), (herein CCW meaning that the driving member rotates and engages with the driven member in counter-clockwise drive direction). While the motor 1 is driven in counter-clockwise drive direction, the first one-way bearing 5 and the third one-way bearing 8 are disengaged, the second one-way bearing 6 is engaged with the motor shaft 2 and directly drives the drive-shaft 7 and the first drive-outlet 9, which provide speed (1) in the counter-clockwise direction. At the same time, the drive-shaft 7 also drives via the second gear down system a2 to the second drive-outlet 17, which provide speed (2) in the counter-clockwise direction. While the motor 1 is driven in clockwise direction, the second one-way bearing 6 is disengaged, the first one-way bearing 5 and the third one-way bearing 8 are engaged with the motor shaft 2 and the drive-shaft 7, driven via the first gear down system a1 to the drive-shaft 7 and the first drive-outlet 9 which provide speed (3) in the counter-clockwise direction. At the same time, the drive-shaft 7 also drives via the second gear down system a2 to the second drive-outlet 17, that provide speed (4) in the counter-clockwise direction.

In FIG. 5c, the first one-way bearing 5 and the third one-way bearing 8 are set in the counter-clockwise drive direction (CCW) in view from the top—(CCW meaning that the driving member rotates and engages with the driven member in counter-clockwise drive direction), the second one-way bearing 6 is set in clockwise drive direction (CW)—(CW meaning that the driving member rotates and engages with the driven member in clockwise drive direction). While the motor 1 is driven in the counter-clockwise direction, the second one-way bearing 6 is disengaged, the first one-way bearing 5 and the third one-way bearing 8 are engaged with the motor shaft 2 and the drive-shaft 7 drives via the first gear down system a1 to the drive-shaft 7 and the first drive-outlet which provide speed (3) in the clockwise direction. At the same time, the drive-shaft 7 also drives via the second gear down system a2 to the second drive-outlet 17 that provide speed (4) in the clockwise direction. While the motor 1 is driven in clockwise direction, the first one-way bearing 5 and the third one-way bearing 8 are disengaged, the second one-way bearing 6 is engaged with motor shaft 2 and directly drives the drive-shaft 7 and the first drive-outlet 9 which provide speed (1) in the clockwise direction. Simultaneously, the drive-shaft 7 also drives via the second gear down system a2 to the second drive-outlet 17 that provide speed (2) in the clockwise direction.

The speed (1) is driven directly by the speed of the motor 1, the speed (2), speed (3) and speed (4) are driven at a lower speed which are in accordance to the ratio of the gear down systems. The gear down systems can be selected from a worm gear down system, a planetary gear down system and other types of gear down systems.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

We claim:

1. A four-speed drive system for household appliances comprising:
   a first drive outlet and a second drive-outlet, each drive-outlet configured to be driven at a different speeds in a same rotational direction;
   a motor and a motor shaft installed in a support bracket, wherein the support bracket is mounted in a base of a household appliance;
   a first one-way bearing installed at a middle section of the motor shaft;

a second one-way bearing installed at an upper end section of the motor shaft;

a drive-shaft mounted in the second one-way bearing, the first drive outlet mounted at an upper end of the drive-shaft;

a third one-way bearing installed at a middle section of the drive-shaft;

a drive gear installed on the third one-way bearing; and wherein the first one-way bearing is installed with a first gear which is connected with and drives a first gear down system;

a second gear is mounted on a lower end of the drive-shaft which drives a second gear down system;

the second drive-outlet is mounted on a top of a third gear which is installed with a fourth bearing, and the second gear down system simultaneously drives the third gear and the second drive-outlet.

2. A four-speed drive system for household appliances according to claim 1, wherein the first gear down system is a worm gear down system.

3. A four-speed drive system for household appliances according to claim 2, wherein the first gear serves as a worm to drive the worm gear down system; the worm gear down system further comprising:

a worm gear which is connected to and driven by the worm, a first bevel gear is set with another side of the worm gear, the first bevel gear connects with and drives a second bevel gear, a top of the second bevel gear is set with a top gear which connects with and drives the drive gear; the drive gear drives the drive-shaft and the first drive-outlet.

4. A four-speed drive system for household appliances according to claim 1, wherein the second gear down system comprises:

the second gear that connects to and drives a fourth gear, a top of the fourth gear is set with a fifth gear that connects to and drives the third gear and the second drive outlet; and the third gear is assembled to the fourth bearing, which is mounted in a gear box shell.

5. A four-speed drive system for household appliances according to claim 1, wherein the first one-way bearing and the third one-way bearing are each set in one drive direction;

the second one-way bearing is set in an opposite drive direction;

the first one-way bearing and the third one-way bearing are each connected with the first gear down system; and the drive-shaft is driven via the second gear down system to the second drive-outlet.

6. A four-speed drive system for household appliances according to claim 2, wherein the first one-way bearing and the third one-way bearing are each set in one drive direction;

the second one-way bearing is set in an opposite drive direction;

the first one-way bearing and the third one-way bearing are each connected with the first gear down system; and the drive-shaft is driven via the second gear down system to the second drive-outlet.

7. A four-speed drive system for household appliances according to claim 3, wherein the first one-way bearing and the third one-way bearing are each set in one drive direction;

the second one-way bearing is set in an opposite drive direction;

the first one-way bearing and the third one-way bearing are each connected with the first gear down system; and the drive-shaft is driven via the second gear down system to the second drive-outlet.

8. A four-speed drive system for household appliances according to claim 4, wherein the first one-way bearing and the third one-way bearing are each set in one drive direction;

the second one-way bearing is set in an opposite drive direction;

the first one-way bearing and the third one-way bearing are each connected with the first gear down system; and the drive-shaft is driven via the second gear down system to the second drive-outlet.

9. A four-speed drive system for household appliances according to claim 1, wherein the first one-way bearing and the third one-way bearing are each set in clockwise drive direction (CW), the second one-way bearing is set in counter-clockwise drive direction (CCW); and when the motor is driven in counter-clockwise direction, the motor shaft directly drives the drive-shaft and the first drive-outlet at a first speed in counter-clockwise direction, simultaneously the drive-shaft drives via the second gear down system, the second drive-outlet at a second speed in counter-clockwise direction; and when the motor is driven in clockwise direction, the motor shaft drives via the first gear down system, the drive-shaft and the first drive-outlet at a third speed in counter-clockwise direction, simultaneously the drive-shaft drives via the second gear down system, the second drive-outlet at a fourth speed in counter-clockwise direction.

10. A four-speed drive system for household appliances according to claim 2, wherein the first one-way bearing and the third one-way bearing are each set in clockwise drive direction (CW), the second one-way bearing is set in counter-clockwise drive direction (CCW); and when the motor is driven in counter-clockwise direction, the motor shaft directly drives the drive-shaft and the first drive-outlet at a speed in counter-clockwise direction, simultaneously the drive-shaft drives via the second gear down system, the second drive-outlet at a second speed in counter-clockwise direction; and when the motor is driven in clockwise direction, the motor shaft drives via the first gear down system, the drive-shaft and the first drive-outlet at a third speed in counter-clockwise direction, simultaneously the drive-shaft drives via the second gear down system, the second drive-outlet at a fourth speed in counter-clockwise direction.

11. A four-speed drive system for household appliances according to claim 3, wherein the first one-way bearing and the third one-way bearing are each set in clockwise drive direction (CW), the second one-way bearing is set in counter-clockwise drive direction (CCW); and when the motor is driven in counter-clockwise direction, the motor shaft directly drives the drive-shaft and the first drive-outlet at a speed in counter-clockwise direction, simultaneously the drive-shaft drives via the second gear down system, the second drive-outlet at a second speed in counter-clockwise direction; and when the motor is driven in clockwise direction, the motor shaft drives via the first gear down system, the drive-shaft and the first drive-outlet at a third speed in counter-clockwise direction, simultaneously the drive-shaft drives via the second gear down system, the second drive-outlet at a fourth speed in counter-clockwise direction.

12. A four-speed drive system for household appliances according to claim 4, wherein the first one-way bearing and the third one-way bearing are each set in clockwise drive direction (CW), the second one-way bearing is set in counter-clockwise drive direction (CCW); and when the motor is driven in counter-clockwise direction, the motor shaft directly drives the drive-shaft and the first drive-outlet at a speed in counter-clockwise direction, simultaneously the drive-shaft drives via the second gear down system, the second drive-outlet at a second speed in counter-clockwise direction; and when the motor is driven in clockwise direction, the motor shaft drives via the first gear down system, the drive-shaft and the first drive-outlet at a third speed in counter-clockwise direction, simultaneously the drive-shaft drives via the second gear down system, the second drive-outlet at a fourth speed in counter-clockwise direction.

13. A four-speed drive system for household appliances according to claim 1, wherein the first one-way bearing and the third one-way bearing are set in counter-clockwise drive direction (CCW), the second one-way bearing is set in clockwise drive direction (CW); and when the motor is driven in clockwise direction, the motor shaft directly drives the drive-shaft and the first drive-outlet, providing a first speed in clockwise direction; simultaneously, the drive-shaft drives via the second gear down system the second drive-outlet, providing a second speed in clockwise direction; and when the motor is driven in counter-clockwise direction, the motor shaft drives via the first gear down system, the drive-shaft and the first drive-outlet which provide a third speed in clockwise direction; simultaneously, the drive-shaft drives via the second gear down system, the second drive-outlet that provides a fourth speed in clockwise direction.

14. A four-speed drive system for household appliances according to claim 2, wherein the first one-way bearing and the third one-way bearing are set in counter-clockwise drive direction (CCW), the second one-way bearing is set in clockwise drive direction (CW); and when the motor is driven in clockwise direction, the motor shaft directly drives the drive-shaft and the first drive-outlet, providing a first speed in clockwise direction; simultaneously, the drive-shaft drives via the second gear down system the second drive-outlet, providing a second speed in clockwise direction; and when the motor is driven in counter-clockwise direction, the motor shaft drives via the first gear down system, the drive-shaft and the first drive-outlet which provide a third speed in clockwise direction; simultaneously, the drive-shaft drives via the second gear down system, the second drive-outlet that provides a fourth speed in clockwise direction.

15. A four-speed drive system for household appliances according to claim 3, wherein the first one-way bearing and the third one-way bearing are set in counter-clockwise drive direction (CCW), the second one-way bearing is set in clockwise drive direction (CW); and when the motor is driven in clockwise direction, the motor shaft directly drives the drive-shaft and the first drive-outlet, providing a first speed in clockwise direction; simultaneously, the drive-shaft drives via the second gear down system the second drive-outlet, providing a second speed in clockwise direction; and when the motor is driven in counter-clockwise direction, the motor shaft drives via the first gear down system, the drive-shaft and the first drive-outlet which provide a third speed in clockwise direction; simultaneously, the drive-shaft drives via the second gear down system, the second drive-outlet that provides a fourth speed in clockwise direction.

16. A four-speed drive system for household appliances according to claim 4, wherein the first one-way bearing and the third one-way bearing are set in counter-clockwise drive direction (CCW), the second one-way bearing is set in clockwise drive direction (CW); and when the motor is driven in clockwise direction, the motor shaft directly drives the drive-shaft and the first drive-outlet, providing a first speed in clockwise direction; simultaneously, the drive-shaft drives via the second gear down system the second drive-outlet, providing a second speed in clockwise direction; and when the motor is driven in counter-clockwise direction, the motor shaft drives via the first gear down system, the drive-shaft and the first drive-outlet which provide a third speed in clockwise direction; simultaneously, the drive-shaft drives via the second gear down system, the second drive-outlet that provides a fourth speed in clockwise direction.

17. A four-speed drive system for household appliances according to claim 1, wherein the first gear down system is a planetary gear down system.

18. A four-speed drive system for household appliances according to claim 1, wherein the second gear down system is a planetary gear down system.

19. A four-speed drive system for household appliances according to claim 9, wherein the first speed is a high speed mode and the second speed is a low speed mode.

20. A four-speed drive system for household appliances according to claim 13, wherein the first speed is a high speed mode and the second speed is a low speed mode.

* * * * *